Sept. 7, 1965                W. F. WISMAR                3,204,926
                        VALVE CONTROL MECHANISM
                         Filed Dec. 21, 1961
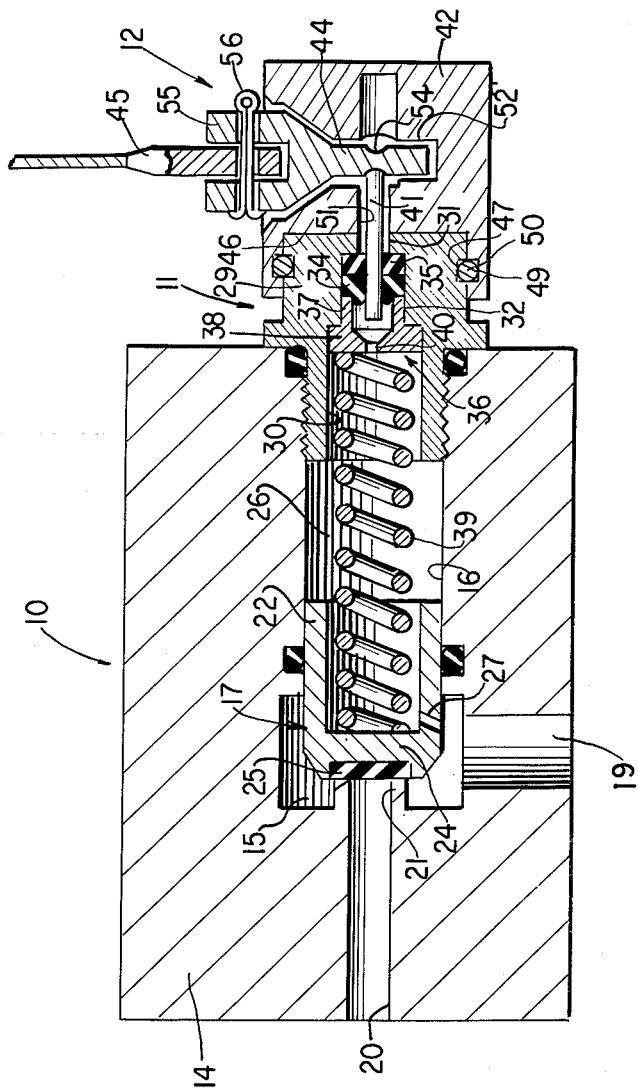
                                              INVENTOR
                                    WILLIAM  F.  WISMAR
                                    BY
                                              AGENT 3,204,926
VALVE CONTROL MECHANISM
William F. Wismar, Union, N.J., assignor to Specialties Development Corporation, Belleville, N.J., a corporation of New Jersey
Filed Dec. 21, 1961, Ser. No. 161,115
5 Claims. (Cl. 251—290)

The present invention relates to valve control mechanisms, and, more particularly, to control mechanisms for valves of the pressure operated type.

In inflation systems designed for manual actuation, the valve is frequently positioned so as to be inaccessible to the operator and it is necessary that the manual actuating force be applied from a remote location.

For this reason many inflation systems utilize a valve having a control mechanism mounted thereon which is operated by pulling on a cable which extends from the mechanism to a point accessible to the operator.

However, the control mechanisms which have been produced in the past for this purpose are generally expensive to manufacture, relatively bulky, and require a substantial force to place them in operation.

Accordingly, an object of the present invention is to provide an improved pull cable actuated valve control mechanism which is not subject to the foregoing difficulties.

Another object is to provide a control mechanism for a pressure operated valve which is adapted to be actuated by a small manually applied force.

Another object is to provide a pull cable actuated valve control mechanism which is capable of operating in response to a pull from any of a number of directions.

A further object is to provide such a valve control mechanism wherein the cable separates from the mechanism when the mechanism is actuated.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention the foregoing objects are accomplished by providing in a valve control mechanism for a pressure operated valve provided with a chamber having a piston means therein for holding the valve closed when the chamber is pressurized, means providing a venting passageway for the chamber; a member inserted in the venting passageway to seal the passageway and adapted to be expelled therefrom by the pressure in the chamber; and removable locking means intersecting the axis of the venting passageway for retaining the member in the venting passageway means.

A preferred embodiment of the invention has been chosen for purposes of illustration and description, and is shown in the accompanying drawing, forming a part of the specification, wherein the single figure of the drawing is a longitudinal sectional view of a pressure operated valve provided with a control mechanism in accordance with the present invention.

Referring to the drawing in detail, there is shown a control mechanism according to the present invention incorporated in a main valve 10 which is pressure operated and normally biased in its closed position by a fluid under pressure and a spring. The control mechanism generally comprises a venting valve 11 which controls the venting of the biasing pressure, and a valve actuating mechanism 12 for opening the valve 11 to thereby cause the main valve 10 to open.

The main valve 10 includes a body 14 formed with a chamber 15 and an intersecting bore 16 in which is positioned a piston 17. The chamber 15 is provided with an inlet port 19 and an outlet port 20 aligned with the bore 16, and a raised valve seat 21 is formed about the outlet port 20.

The piston 17 has a tubular body 22 and a head portion 24 to which is secured a valve member 25 for engaging the valve seat 21. The end of the bore 16 is closed by the venting valve 11 to form a chamber 26 behind the piston 17, and a pressure biasing passageway 27 is provided in the body 22 of the piston 17 to permit the chamber 26 to be pressurized to the inlet pressure.

The venting valve 11 includes a cap 29 threaded into the bore 16 and having a stepped central bore including a large diameter end section 30 and a small diameter end section 31 separated by an intermediate diameter section 32. An O-ring 34 is positioned within the bore section 32 between a washer 35 and a retainer 36. The retainer 36 has a tubular section 37 within the bore portion 32 and a head portion 38 within the bore section 30. A coil spring 39 is seated against the retainer and biases the piston 17 toward the valve seat 21.

A gas passageway 40 of substantially greater cross-sectional area than said biasing passageway 27 is provided in the retainer 36, and a valve pin 41 extends through the bore section 31 into the tubular retainer section 37 to form a seal with the O-ring 34.

The valve actuating mechanism 12 includes a cylindrical control head 42, a trigger pin 44, and a pull cable assembly 45. The end of the head 42 is provided with an annular recess 46 for mounting the head upon the end of the cap 29. An annular groove 47 is provided on the cap 29 in alignment with a cooperating groove 49 within the recess 46, and a metal ring 50 is positioned within the annular space formed by the grooves to lock the head 42 against axial motion while permitting rotary motion. The head 42 is further provided with an axial bore 51 concentric with the recess 46 and aligned with the bore section 31, and a transverse bore 52 intersecting the bore 51 for receiving the pin 44. The pin 44 is provided with a shallow annular groove 54 for engaging the end of the valve pin 41 and a forked head 55 to which the pull cable assembly 45 is attached by means of a cotter pin 56.

In operation, the valve is connected to a container through the inlet port 19 and the container is charged with high pressure fluid medium, for example, through the outlet 20. During the charging operation, high pressure gas flows through the passageway 27 into the chamber 26 so that when the charging operation is completed the piston is held closed by the pressure in the chamber 26 and the force of the spring 39 which are opposed only by the pressure in the chamber 15 acting on the surface of the piston 17 disposed outwardly of the valve seat 21.

The pressurized fluid in the chamber 26 also flows through the passageway 40 of the retainer 36 and acts upon the end of the valve pin 41 to urge it against the trigger pin 44.

To open the valve, the remote end (not shown) of the pull cable assembly 45 is pulled to remove the pin 44 from the bore 52 to thereby allow the pressure in the chamber 26 to expel the valve pin 41 from the cap 29. The pressure in the chamber 26 is thereby vented and the pressure in chamber 15 drives the piston 17 and the valve member 25 thereon away from the valve seat 21 to open the valve.

From the foregoing description, it will be seen that the present invention provides an improved control mechanism for a pressure operated inflation valve which is inexpensive, compact, simple, and is actuated by a small force manually applied to a pull cable in any of a number of directions.

As various changes may be made in the form, construction and arrangement of the parts herein, without departing from the spirit and scope of the invention and with-

I claim:

1. In a valve control mechanism for a pressure operated valve of the type provided with a chamber having piston means therein for holding the valve closed when the chamber is pressurized, the combination of a body provided with a venting passageway therein having an inlet end and an outlet end, means adapted to operatively mount said body on a pressure operated valve, a member inserted in said passageway sealing said passageway and adapted to be expelled therefrom by fluid pressure at said inlet end of said passageway, a control head rotatably mounted on said body to rotate about the longitudinal axis of said member, said control head having a first bore for receiving said member, said first bore being of a length sufficient to enable said member to be completely expelled from said passageway, and a second bore intersecting said first bore, and removable locking means removably positioned in said second bore for engaging said member to retain said member in said venting passageway, said member being of sufficient length to extend from said locking means into said venting passageway.

2. In a valve control mechanism for a pressure operated valve of the type provided with a chamber having piston means therein for holding the valve closed when the chamber is pressurized, the combination of a body provided with a venting passageway therein having an inlet end and an outlet end, means adapted to operatively mount said body on a pressure operated valve, a cylindrical pin inserted in said venting passageway sealing said passageway and adapted to be expelled therefrom by fluid pressure at said inlet end of said passageway, resilient annular sealing means in said passageway for circumferentially engaging said pin, and removable locking means intersecting the longitudinal axis of said venting passageway for retaining said pin in said passageway, said pin being of sufficient length to extend from said locking means into sealing engagement with said annular sealing means.

3. Apparatus according to claim 1, wherein said member is a cylindrical pin, said venting passageway is provided with resilient annular sealing means for circumferentially engaging said pin.

4. In a valve control mechanism for a pressure operated valve of the type provided with a chamber having piston means therein for holding the valve closed when the chamber is pressurized, the combination of; a body providing a venting passageway having an inlet end and an outlet end; means adapted to operatively mount said body on a pressure operated valve a cylindrical pin in said passageway adapted to be expelled therefrom by fluid pressure at said inlet end of said passageway and having an inner end and an outer end; annular sealing means in said passageway for circumferentially engaging said pin to seal said passageway; a control head mounted on said body having a first bore aligned with said passageway at said outlet end thereof and having a second bore intersecting said first bore substantially at right angles thereto; and a locking member removably positioned in said second bore to be engaged by said outer end of said pin to retain said pin in sealing relationship with said annular sealing means, said pin being of sufficient length to extend from said locking member inwardly past said sealing means, and said first bore extending outwardly past said second bore a distance sufficient to permit said pin to be moved by the pressure at said inlet end of said passageway out of engagement with said sealing means when said locking member is removed.

5. Apparatus according to claim 4, wherein said venting passageway includes wall means adjacent the inlet end thereof for retaining said pin in said passageway.

References Cited by the Examiner

UNITED STATES PATENTS

| 734,698 | 7/03 | Ghirelli | 137—467 |
| 858,063 | 6/07 | Delany | 251—43 |
| 1,651,689 | 12/27 | Freeze | 251—44 |
| 2,701,116 | 2/55 | Roth | 251—66 |
| 2,778,599 | 1/57 | Paul | 251—66 |

ISADOR WEIL, *Primary Examiner.*

MARTIN P. SCHWADRON, *Examiner.*